(12) United States Patent
Saga et al.

(10) Patent No.: US 6,256,277 B1
(45) Date of Patent: Jul. 3, 2001

(54) INFORMATION RECORDING APPARATUS HAVING CONTROLLED RECORDING ENERGY GENERATION CIRCUIT

(75) Inventors: Hideki Saga, Kokubunji; Hirofumi Sukeda, Tokorozawa, both of (JP)

(73) Assignee: Htiachi Ltd., Tokyo (JP)

( * ) Notice: Subject to any disclaimer, the term of this patent is extended or adjusted under 35 U.S.C. 154(b) by 0 days.

(21) Appl. No.: 09/206,985

(22) Filed: Dec. 8, 1998

(30) Foreign Application Priority Data

Dec. 9, 1997 (JP) .................................................. 9-338459

(51) Int. Cl.$^7$ ........................................................ G11B 5/76
(52) U.S. Cl. ...................... 369/59.24; 369/47.51
(58) Field of Search ............................ 369/54, 58, 47, 369/48, 116, 47.15, 47.49, 47.5, 47.51, 53.26, 53.27, 59.27, 59.13, 59.23, 59.24, 124.01

(56) References Cited

U.S. PATENT DOCUMENTS

| | | | |
|---|---|---|---|
| 5,513,165 | * 4/1996 | Ide et al. ............................ | 369/13 X |
| 5,642,343 | * 6/1997 | Toda et al. ............................ | 369/54 |
| 5,732,061 | * 3/1998 | Kirino et al. ...................... | 369/54 X |

* cited by examiner

Primary Examiner—Paul W. Huber
(74) Attorney, Agent, or Firm—Antonelli, Terry, Stout & Kraus, LLP

(57) ABSTRACT

An information recording apparatus for injecting an energy beam into a recording medium to form locally a region different in physical properties from a non-recording region to thereby record information, has a drive for driving an energy generation source for changing the number of injected energy pulses in a mark forming period in accordance with the mark length so that the interval between arbitrary two points of the change of injected power level at the time of information recording is substantially set to be longer than a half of a detection window width in order to make it easy to drive a recording energy generation source to thereby form said mark accurately and speedily and, at the same time, in order to secure a sufficient time required for cooling the recording medium.

9 Claims, 8 Drawing Sheets

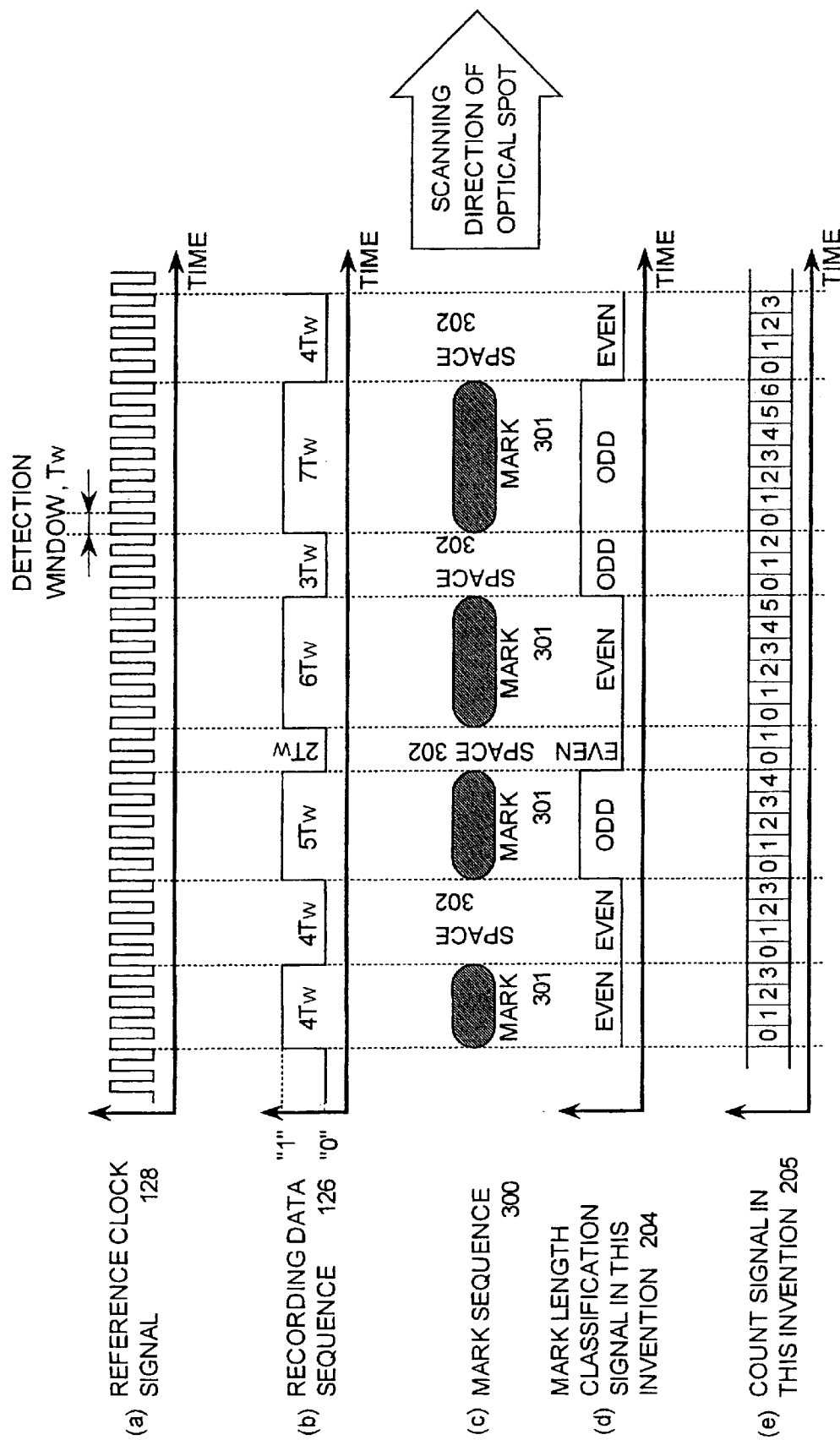

218
INFORMATION RECORDING APPARATUS HAVING CONTROLLED RECORDING ENERGY GENERATION CIRCUIT

BACKGROUND OF THE INVENTION

The present invention relates to an information recording apparatus for injecting an energy beam into a recording medium to form a mark different in physical properties from a non-mark portion to thereby record information and particularly to an optical disk device.

Currently, generally available optical disks may be roughly classified into magneto-optical disks of the type in which a recording film is heated to form marks by means of inversion magnetic domains on the recording film, and phase-change disks of the type in which the quantity of given energy beam at the time of heating is controlled to thereby change the cooling speed of a recording film to form marks by means of amorphous regions on the recording film. In order to attain improvement in information transfer speed of these optical disks at the time of recording/reproducing operation, there are a method of increasing recording linear density and a method of increasing the scanning speed of the recording medium scanned by a light spot. Examples of the method of increasing recording linear density may include a method of shrinking/shortening mark/space length and a method of shortening the time pitch of the change of mark/space length to thereby reduce the time span for detecting the mark edge position. In such a method of increasing recording linear density, however, the signal-to-noise ratio in a reproduced signal becomes a problem. Accordingly, in the present situation, it is impossible to expect great increase of the recording linear density.

For the purpose of forming minute marks accurately on an optical disk as a first prior art, JP-A-5-298737 (laid-open on Nov. 12, 1993) discloses a method in which a recording waveform corresponding to a mark forming period is constituted by a sequence of pulses corresponding to the mark length of a recording data sequence and the number and amplitude of pulses are controlled in accordance with the length of the recording data sequence. The recording waveform of the mark forming period is divided into two parts, namely, a heat part and a tail part. The two parts are generally different in pulse height from each other. Further, in a mark non-forming period of the recording waveform, a pause part is pre-positioned to thereby generate recording auxiliary pulses. In the above first prior art, it is said that heat diffusion from a preceding mark forming portion to a mark front edge position just after the mark forming portion can be compensated by the method of the first prior art regardless of the space length so that the mark width and the mark edge position can be controlled accurately. Here, the mark forming period is representative of or corresponds to a mark length in a recording data sequence, and is defined as a period from the leading edge of the first one of pulses having an energy level for supplying recording energy required for formation of a single mark, that is, pulses having such an energy level that any mark cannot be formed if the energy level is not generated, to the trailing edge of the last pulse, as shown in FIG. 3. Further, the mark non-forming period is representative of or corresponds to a space length in a recording data sequence, and is defined as a period except the mark forming period. The above definition is common to the whole description in this specification.

Further, as a second prior art, JP-A-8-7277 (laid-open on Jan. 12, 1996) discloses a method in which each recording data is decomposed into a plurality of basic elements different in length from each other so that one recording pulse corresponds to one element, and each recording data is formed as a series of independent recording marks recorded by corresponding element pulses. In the second prior art, it is said that not only the lowering of the reproduced signal level can be prevented but also recording can be performed stably also in a modulation system including long marks even if independent marks are recorded by the disclosed method. Further, it is said that increase of jitter in a reproduced signal after repetition of rewriting can be suppressed in a rewritable type recording medium.

Further, as a third prior art, JP-A-9-134525 (laid-open on Oct. 22, 1986) discloses a method in which the pulse width of succeeding heating pulses and succeeding cooling pulses is selected to be substantially equal to a recording channel clock period in the case where an even-number or odd-number mark length with respect to the recording channel clock period is recorded in a multi-pulse recording system using a head heating pulse, succeeding heating pulses, succeeding cooling pulses and a tail cooling pulse. In the third prior art reference, it is said that the cooling time of the recording medium can be secured sufficiently so that accurate edge position control can be made by the disclosed method.

As other prior art references as for waveform control, there are JP-A-55-139693 (laid-open on Oct. 31, 1980), JP-A-61-237233 (laid-open on Oct. 22, 1986), etc.

SUMMARY OF THE INVENTION

In the first prior art, one recording pulse corresponds to an extension of marks corresponding to the detection window width. Accordingly, when the detection window width is shortened, the semiconductor laser diode which is a recording energy generating source is required to be driven at a higher speed than the conventional speed. For example, when a general (1, 7) modulation system is used to achieve a burst transfer rate of 10 MBytes/sec equivalent to that of a magnetic disk device, the detection window width in a reproduced signal becomes about 8.3 ns and, accordingly, the shortest recording current pulse width becomes about 4.2 ns which is about half the detection window width. It is, however, difficult to generate recording light pulses accurately because the time of the order of several nano seconds is required for starting of the semiconductor laser. Even if recording light pulses can be generated accurately, normal mark formation cannot be made because the next light pulse is radiated while the heated portion is not yet cooled sufficiently in the case where multi-pulse recording is applied to a medium such as a phase-change disk in which mark formation is controlled on the basis of the cooling speed of the heated portion. For example, when a (1, 7) modulation system is used to achieve a burst transfer rate of 10 MBytes/sec as described above, marks cannot be formed correctly in accordance with the characteristic of the recording medium because the cooling time of the recording medium becomes about 4.2 ns which is equal to the shortest recording current pulse width.

In the second prior art, there is disclosed a method in which each recording data is decomposed into a plurality of basic elements different in length from each other so that one recording pulse corresponds to one element, and each recording data is formed as a series of independent recording marks recorded by means of recording pulses. In the second prior art, however, thermal balance between recording pulses corresponding to elements is not taken into consideration, so that a problem arises in mark edge position control as recording linear density increases. That is, when marks corresponding to one recording data are to be formed, the recording mark width varies in accordance with the position so that accurate edge recording cannot be performed because the quantity of heat accumulated in the recording film in the head part of the recording data is different from the quantity of heat accumulated in the recording film in the tail part of the recording data.

In the third prior art, there is a case where a considerably shorter pulse than the detection window width is inserted into the recording waveform in the vicinity of the intermediate part of the mark forming period so that the mark width varies in the vicinity of the intermediate part of the mark forming period more greatly than in the other parts. In the description of the third prior art reference, it is said that the variation of the signal amplitude in the intermediate part of the mark forming period does not become any problem if the mark edge position is accurate when mark edge recording is performed. In the case of a recording/reproducing apparatus in which the recording/reproducing condition is determined on the basis of the detection of the averaged reproduced signal level, however, the distortion of such a reproduced signal has a bad influence on the operation of the apparatus. For example, in the case of a phase-change recording medium, a signal can be detected on the basis of the change in reflection factor similarly to the case of a phase-pit type recording medium. Accordingly, the phase-change recording medium has an advantage that it can be easily used by a reproducing apparatus of the phase-pit type recording medium because of common detection principle. In the case of a phase-change recording media, however, it is difficult to perform reproduction by means of the same apparatus as used for the phase-pit type recording medium because there is no aforementioned distortion in the signal reproduced from the phase-pit type recording medium.

Accordingly, as described above, in each of the above-mentioned prior arts, sufficiently accurate marks cannot be formed when the transfer rate is high. As a result, in the prior arts, it was impossible to realize sufficient recording areal density and reliability.

In order to form marks stably to perform high-reliable recording/reproducing, recording waveforms free from the aforementioned problems must be selected. In addition to the condition that marks can be formed accurately, the following two conditions are required for the recording waveforms. That is, the first condition is that the semiconductor laser which is a light source can be driven easily, and the second condition is that a sufficient cooling time can be secured for the recording medium.

According to an aspect of the present invention, an information recording apparatus for injecting an energy beam into a recording medium to form a mark different in physical properties from a non-mark portion to thereby record information, comprises: an encoding means for converting information into a recording data sequence; an energy generation means for generating energy required for recording; and an energy generation means drive means for changing the number of injected energy pulses in a mark forming period in accordance with mark length in the recording data sequence so that an interval between arbitrary specific points of change in injected energy per unit time or injected power in the mark forming period for an arbitrary-length mark is longer than a half of the detection window width.

According to another aspect of the present invention, an information recording apparatus for injecting an energy beam into a recording medium to form a mark different in physical properties from a non-mark portion to thereby record information, comprises: an encoding means for converting information into a recording data sequence; a classification means for performing classification in accordance with a predetermined rule by referring to mark length in the recording data sequence; an energy generation means for generating energy required for recording; and an energy generation means drive means for changing the number of injected energy pulses in a mark forming period in accordance with the mark length in the recording data sequence, wherein the drive means drives the energy generation means in accordance with a procedure which becomes different on the basis of a result of the classification performed by the classification means.

According to a further aspect of the present invention, an information recording apparatus for injecting an energy beam into a recording medium to form a mark different in physical properties from a non-mark portion to thereby record information, comprises: an encoding means for converting information into a recording data sequence; an energy generation means for generating energy required for recording; and an energy generation means drive means for changing the number of injected energy pulses in a mark forming period in accordance with mark length in the recording data sequence, wherein: the drive means drives the energy generation means so that an output waveform of the energy generation means at head or tail part of a mark forming period has periodicity with respect to the mark length; and the drive means drives the energy generation means so that the energy generation means outputs two or more kinds of waveforms in accordance with change in the mark length corresponding to the shortest mark length in the mark forming period.

According to the following embodiment of the present invention, the cooling time of the recording medium can be secured sufficiently or the frequency component of the laser drive current can be reduced. Accordingly, even if the transfer rate is high, sufficiently accurate marks can be formed, so that sufficient recording areal density and reliability can be achieved.

DETAILED DESCRIPTION OF THE INVENTION

An embodiment of the present invention will be described below. Although, in this embodiment, description will be made about the case where a magneto-optical medium is used as a recording medium, it is a matter of course that the recording medium is not limited specially but the invention is a technique common to recording media (such as phase-change type recording media, etc.) of the type for injecting an energy beam into a recording medium to form a mark different in physical properties from a non-mark portion to thereby record information.

In the following embodiment, the level of recording energy means the averaged energy level in a period about half the detection window width (a unit of the change of the edge position of mark/space). In the case where a component having a frequency sufficiently higher than the frequency in a period corresponding to the detection window width is superimposed on the recording waveform for some reason (such as suppression of laser noise, or the like), the level of recording energy means the averaged energy level in a period which is so long that the influence of the frequency component can be neglected.

Figure 1:
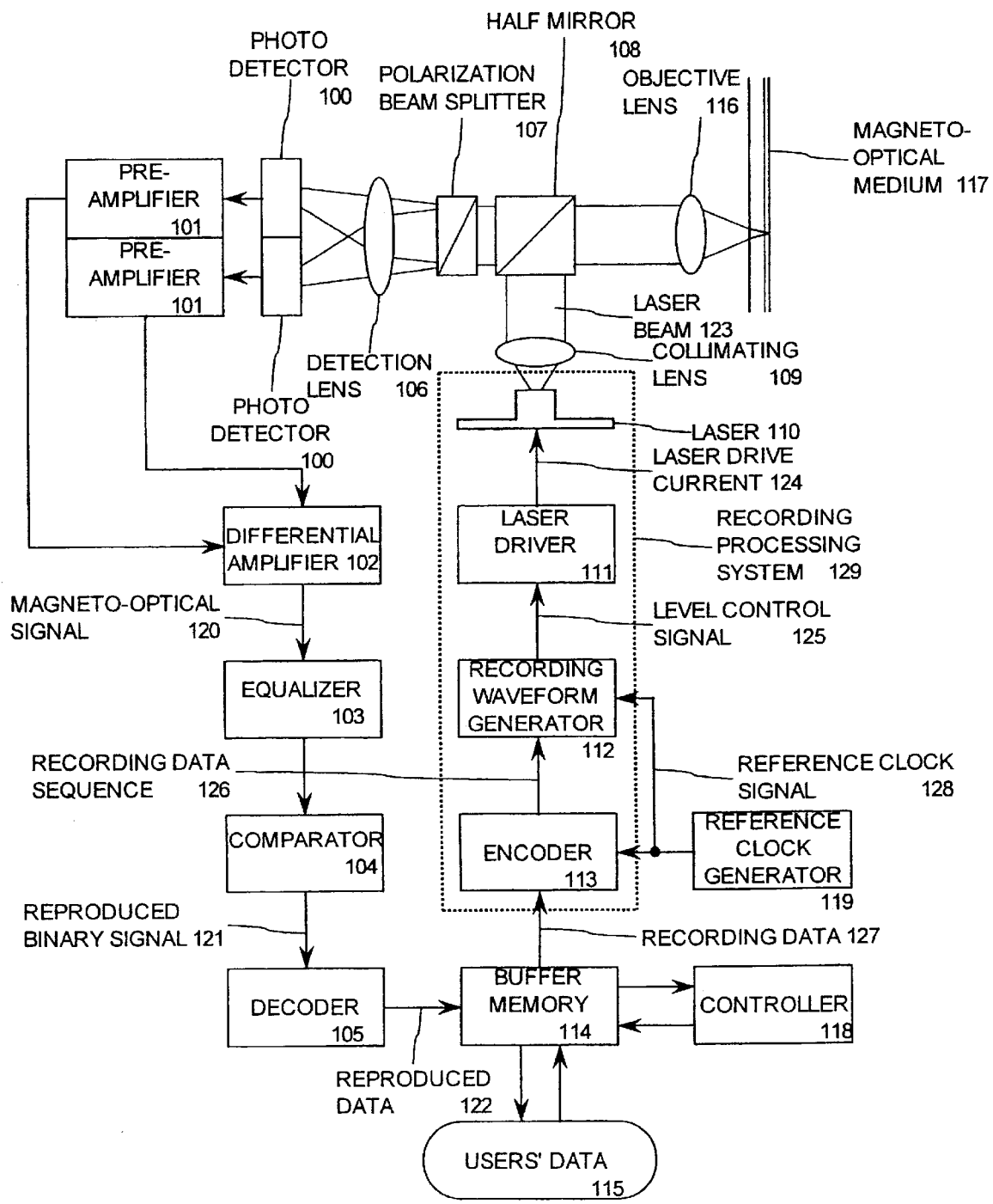
FIG. 1 is a diagram showing the overall configuration of an information recording apparatus according to an embodiment of the present invention.

FIG. 1 is a diagram showing an example of the overall configuration of an information recording apparatus according to the present invention. User data 115 to be recorded are controlled by a controller 118 so as to be temporarily stored in a buffer 114 unless the quantity of user data 115 reaches a predetermined value. Recording data 127 supplied from the buffer 114 are converted by means of an encoder 113 into a recording data sequence 126 corresponding to the arrangement of marks (not shown) formed on a magneto-optical medium 117. The recording data sequence 126 is transmitted to a recording waveform generator 112 in which the recording data sequence 126 is converted into a level control signal 125 in accordance with the recording waveform. The encoder 113 and the recording waveform generator 112 operate in synchronism with a reference clock signal 128 generated by a reference clock generator 119. A laser driver 111 generates a laser drive current 124 by referring to the level control signal 125 to make a laser 110, which is a recording energy source, emit a laser beam 123 in accordance with a predetermined recording waveform. The laser beam 123 emitted from the laser 110 is focussed onto the magneto-optical medium 117 via a collimating lens 109, a half mirror 108 and an objective lens 116 to heat a recording film (not shown) to thereby form marks. For reproduction of information, the mark arrangement on the magneto-optical medium 117 is scanned by a laser beam 123 having a level low enough not to destroy the marks. The beam reflected from the magneto-optical medium 117 enters into a polarization beam splitter 107 via the objective lens 116 and the half mirror (semitransparent mirror) 108. In the polarization beam splitter 107, the reflected light having a polarization plane rotated in accordance with the direction of magnetization of the marks is split into polarized beams perpendicular to each other, so that the polarized beams are led onto photo detectors 100 respectively via a detection lens 106. The intensity values of the polarized beams perpendicular to each other are converted into electric signals proportional thereto by the photo detectors 100 respectively. After being amplified by pre-amplifiers 101 provided in the photo detectors 100 respectively, the electric signals are transmitted to a differential amplifier 102. The differential amplifier 102 calculates the difference between input signals and generates a magneto-optical signal 120 in accordance with the presence/absence of a mark in the scanning position on the magneto-optical medium 117. The magneto-optical signal 120 is subjected to a wave equalizing process by an equalizer 103 and then converted into a reproduced binary signal 121 by a comparator 104. Further, a decoder 105 applies conversion reverse to that of the encoder 113 with respect to the reproduced binary signal 121, so that reproduced data 122 are stored in the buffer 114. The reproduced data 122 in the buffer 114 are controlled by the controller 118 so that the reproduced data 122 are outputted, as finally reproduced user data 115, to the outside of this apparatus if the quantity of the reproduced data 122 reaches a predetermined value.

Figure 2:
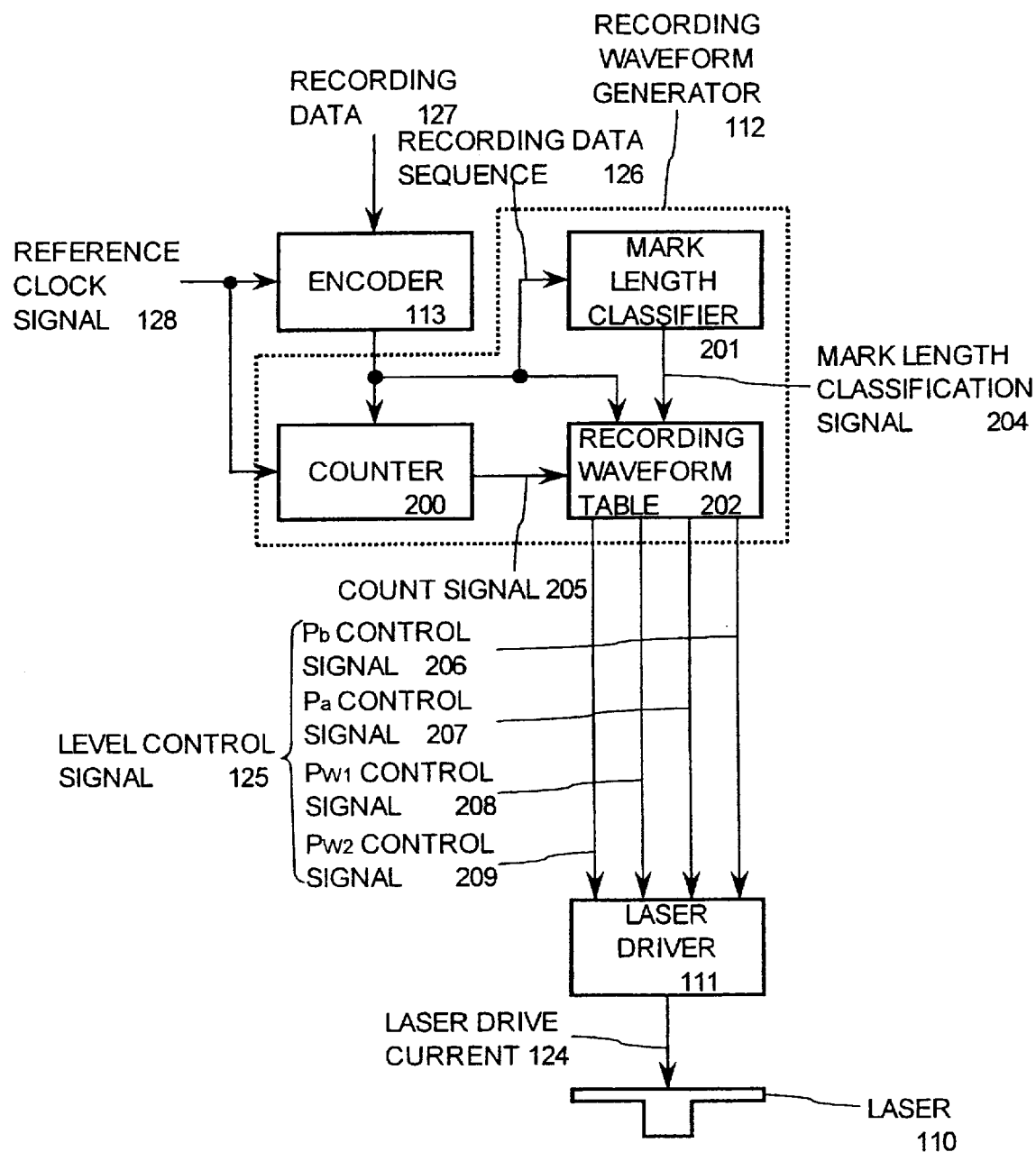
FIG. 2 is a diagram showing the configuration of the recording processing system according to the embodiment of the present invention.

FIG. 2 is a detailed diagram showing an example of the configuration of a recording processing system 129 depicted in FIG. 1. In the encoder 113, the recording data 127 are converted into a recording data sequence 126 which exhibits information concerning mark length, space length and head positions thereof. The recording data sequence 126 is transmitted to both a mark length classifier 201 and a recording waveform table 202. The mark length classifier 201 classifies the mark length of the recording data sequence 126 in accordance with a predetermined rule and inputs a result of the classification, as a mark length classification signal 204, to the recording waveform table 202. On the other hand, a counter 200 measures time, with the reference clock signal 128 taken as a unit, from the mark head position by referring to the recording data sequence 126 and generates a count signal 205. From the recording waveform table 202, level control signals 125 representative of predetermined recording waveforms in accordance with the recording data sequence 126, the mark length classification signal 204 and the count signal 205 are transmitted to the laser driver 111. The laser driver 111 synthesizes a laser drive current 124 by referring to these level control signals 125 and drives the laser 110 which is a recording energy source.

Figure 3:
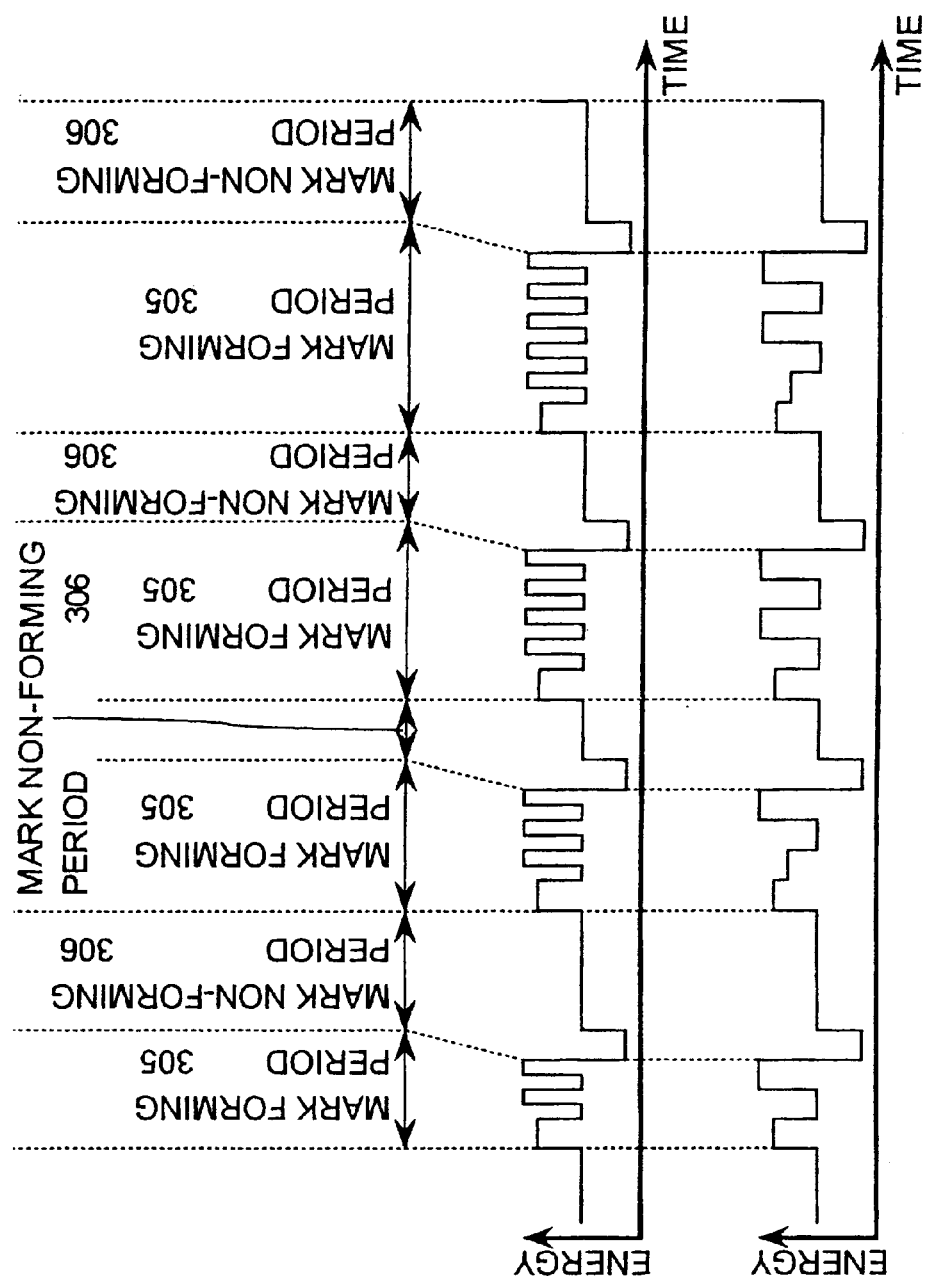
FIG. 3 is a view for explaining the operation of the recording processing system according to the embodiment of the present invention and the operation of a recording processing system in the prior art.

The diagrams (a) to (g) of FIG. 3 show marks/spaces in a recording data sequence and an example of the recording waveform generating operation for recording the marks/spaces in a conventional or prior system and in an apparatus according to the present invention. In the following description of recording waveforms, recording waveforms before microadjustment are compared with each other in the case where the length or level in a part period of the recording waveform is microadjusted by referring to preceding and following recording patterns, or the like, for some reason. Accordingly, in the following description of recording waveforms, recording waveforms are compared with each other in the case where recording patterns are identical to each other in sufficiently long distances before and after a mark thus formed. Here, the "sufficiently long distance" means a distance which is sufficiently longer than the distance on a medium affected by injection of recording energy in a period substantially equal to the detection window width. The diagram (a) of FIG. 3 shows a reference clock signal 128 which forms a time reference for the recording operation. The reference clock signal 128 takes a period of Tw. The diagram (b) of FIG. 3 shows a recording data sequence 126 as a result of conversion of recording data by the encoder 113. Here, Tw is the detection window width which is the minimum unit of the change quantity of mark/space length in the recording data sequence 126. The diagram (c) of FIG. 3 shows an image of a mark arrangement on the recording medium. The scanning direction of a laser light spot for recording/reproducing is from left to right in the diagram (c) of FIG. 3. The marks 301 have one-to-one correspondence with the "1" level in the recording data sequence 126. Each mark 301 is formed to have a length proportional to the period of the "1" level. The diagram (d) of FIG. 3 shows a mark length classification signal 204 in the apparatus according to the present invention. In this embodiment, mark lengths are classified into odd-number lengths and even-number lengths. The diagram (e) of FIG. 3 shows a count signal 205 in the present invention. The time from the head of each of marks 301 and spaces 302 is counted with the period Tw as a unit. The diagrams (f) and (g) of FIG. 3 show examples of recording waveforms in the prior system and in the apparatus according to the present invention respectively corresponding to the recording data sequence 126 depicted in the diagram (b) of FIG. 3. These recording waveforms 303 and 304 are generated by referring to the count signal 205 and the recording data sequence 126. Further, in the apparatus according to the present invention, not only the aforementioned signals but also the mark length classification signal 204 is referred to. The shortest cycle of recording waveform pulses in the prior system is Tw whereas the shortest cycle in the apparatus according to the present invention is 2 Tw. Accordingly, the shortest cooling time in the example 304 of recording waveform in the apparatus according to the present invention is kept about twice as long as that in the example 303 of recording waveform in the prior system.

Figure 4:
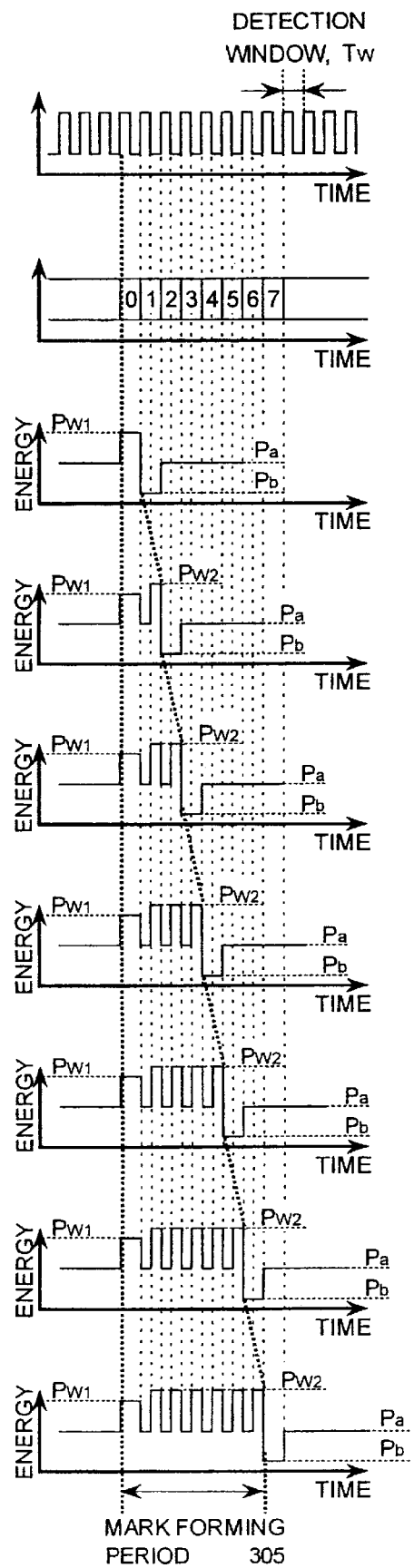
FIG. 4 is a view for explaining an example of recording waveforms in the recording processing system in the prior art.

Next, the diagrams (a) to (i) of FIG. 4 show examples 400 to 406 of recording waveforms in the prior system. Assume now, as an example, that NRZI modulation is applied after (1, 7) modulation coding rule of the encoder 113. Accordingly, the mark/space length is always from 2 Tw to 8 Tw, inclusively. The diagram (a) of FIG. 4 shows a reference clock signal 128. Respective elements of the recording processing system 129 operate in accordance with the reference clock signal 128. The diagram (b) of FIG. 4 shows a count signal. The time from the head of a mark is measured with the detection window Tw as a unit. The timing at which the count signal shifts to zero corresponds to the head of a mark or space. The diagram (c) of FIG. 4 shows a recording waveform at the time of the formation of a 2 Tw-length mark. A mark forming period 305 is constituted by a pulse having a length of 1 Tw and a level of Pw1. In a mark non-forming period, a period having a width of 1 Tw and a level of Pb is placed in the head and then a level of Pb is kept until the next mark forming period comes. The diagram (d) of FIG. 4 shows a recording waveform at the time of the formation of a 3 Tw-length mark. A mark forming period 305 is constituted by a pulse having a length of 1 Tw and a level of Pw1 in the same manner as shown in the diagram (c) of FIG. 4, a period having a length of 0.5 Tw and a level of Pa, and a period having a length of 0.5 Tw and a level of Pw2. The diagrams (e) to (i) of FIG. 4 show recording waveforms at the time of the formation of 4 Tw- to 8 Tw-length marks respectively. A period having a length of 0.5 Tw and a level of Pa and a period having a length of 0.5 Tw and a level of Pw2 per mark length 1 Tw are added to the tail part in the mark forming period. In the mark non-forming period, a period having a length of 1 Tw and a level of Pb is placed in the head regardless of the space length and then a level of Pa is kept until the next mark forming period comes. In these examples of recording waveforms, the shortest cooling period in the mark forming period 305 is 0.5 Tw.

Figure 5:
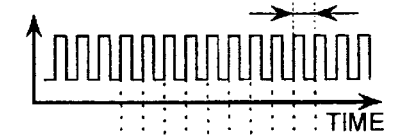
FIG. 5 is a view for explaining an example of recording waveforms in the recording processing system according to the embodiment of the present invention.
Figure 5:
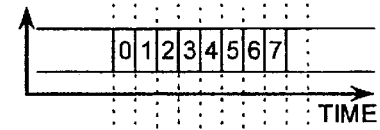
Figure 5:
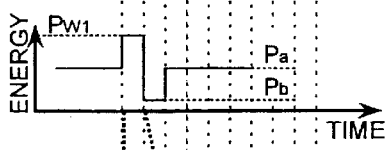
Figure 5:
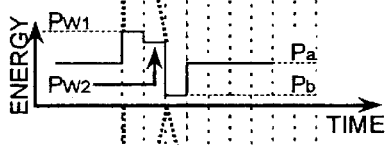
Figure 5:
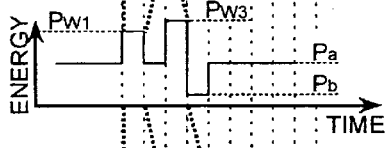
Figure 5:
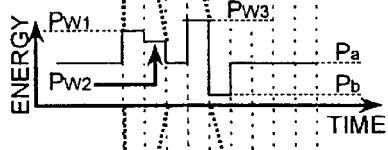
Figure 5:
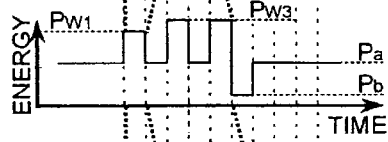
Figure 5:
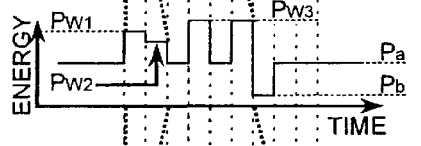
Figure 5:
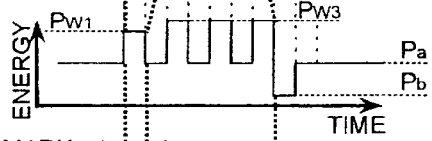

Examples 500 to 506 of recording waveforms in the apparatus according to the present invention will be described below with reference to the diagrams (a) to (i) of FIG. 5 to explain the operation of the recording waveform generator 112 depicted in FIG. 2. Assume that the encoder 113 has a coding rule in which NRZI modulation is applied after (1, 7) modulation in the same manner as in the diagrams (a) to (i) of FIG. 4. Accordingly, the mark/space length is always from 2 Tw to 8 Tw, inclusively. However, the invention is not limited to the coding rule of the encoder 113, but it can be applied to an encoder 113 having an arbitrary coding rule (such as Eight-to-Fourteen modulation, (8–16) modulation, or the like). Assume further that the operation of the mark length classifier 201 in FIG. 2 is division (an arithmetic operation for remainder) by a divisor 2 and the mark length classification signal discriminates the mark/space in the recording data sequence in the case of an even-number multiple of the detection window width Tw or an odd-number multiple of the detection window width Tw. Although description is made about the case where the divisor is 2 for simplification, it is a matter of course that the classification of the mark length is not limited to this, but another divisor not smaller than 3 may be used with no problem. Although description is made about the case where the operation of the mark length classifier 201 is an arithmetic operation for remainder, it is a matter of course that the structure and operation of the mark length classifier 201 are not limited specially but any other classification means may be used. The diagram (b) of FIG. 5 shows a count signal 205 generated by the counter 200. The time from the head of a mark is measured with the detection window Tw as a unit. The timing at which the count signal shifts to zero corresponds to the head of a mark or space. The diagram (c) of FIG. 5 shows a recording waveform at the time of the formation of a 2 Tw-length mark. A mark forming period 305 is constituted by a pulse having a length of 1 Tw and a level of Pw1. In a mark non-forming period, a period having a length of 1 Tw and a level of Pb is placed in the head and then a level of Pa is kept until the next mark forming period comes. The diagram (e) of FIG. 5 shows a recording waveform at the time of the formation of a 4 Tw-length mark. A mark forming period 305 is constituted by a pulse having a length of 1 Tw and a level of Pw1 in the same manner as shown in the diagram (c) of FIG. 5, a period having a length of 1 Tw and a level of Pa, and a period having a length of 1 Tw and a level of Pw3. After that, when the mark length is an even-number multiple of the detection window width Tw as shown in the diagrams (g) and (i) of FIG. 5, a period having a length of 1 Tw and a level of Pa and a period having a length of 1 Tw and a level of Pw3 per mark length 2 Tw are added to the tail part of the mark forming period. The diagram (d) of FIG. 5 shows a recording waveform at the time of the formation of a 3 Tw-length mark. A mark forming period 305 is constituted by a pulse having a length of 1 Tw and a level of Pw1 in the same manner as shown in the diagram (c) of FIG. 5, and a period having a length of 1 Tw and a level of Pw2. After that, when the mark length is an odd-number multiple of the detection window width Tw as shown in the diagrams (f) and (h) of FIG. 5, a period having a length of 1 Tw and a level of Pa and a period having a length of 1 Tw and a level of Pw3 per mark length 2 Tw are added to the tail part in the mark forming period. In the mark non-forming period, a period having a length of 1 Tw and a level of Pb is placed in the head regardless of the space length and then a level of Pa is kept until the next mark forming period comes. In these examples of recording waveforms, the shortest cooling period in the mark forming period 305 is 1 Tw.

Incidentally, an intermediate part 508 of the mark forming period 305 is a part of the mark forming period excluding the head and tail parts. The intermediate part is constituted by pulses having a constant period and a constant amplitude value in accordance with the mark length. The head part of the mark forming period is a part prior to the intermediate part in the mark forming period. That is, the head part is a leading part in the mark forming period. The tail part of the mark forming period is a part posterior to the intermediate part in the mark forming period. That is, the tail part is a terminal part of the mark forming period. Although a recording waveform is generally constituted by head, intermediate and tail parts in a mark forming period, it is not always necessary to provide all three parts.

In the examples shown in the diagrams (c) to (i) of FIG. 5, the recording waveform in each mark forming period 305 is constituted only by head and intermediate parts 507 and 508 of the mark forming period. The interval between arbitrary two points of the change of the energy level in a mark forming period for an arbitrary-length mark is always longer than Tw and is an integer multiple of Tw. The head part 507 of the mark forming period is a part having a level of Pw1 or Pw2. The intermediate part 508 of the mark forming period is a part in which a period having a level of Pw3 and a length of 1 Tw and a period having a level of Pa and a length of 1 Tw are alternated continuously. The tail part of the mark forming period has a length of zero, that is, there is no tail part in the mark forming period. In this case, the head part of the mark forming period has periodicity of 2 Tw with respect to the mark length. That is, when the mark length is an odd-number sequence such as 3 Tw, 5 Tw or 7 Tw, the recording waveform in the head part 507 of the mark forming period has periodic analogy (a length of 1 Tw, a level of Pw1 followed by a length of 1 Tw, a level of Pw2). When the mark length is an even-number sequence such as 2 Tw, 4 Tw, 6 Tw or 8 Tw, the recording waveform in the head part 507 of the mark forming period has periodic analogy (a length of 1 Tw, a level of Pw1).

Figure 6:
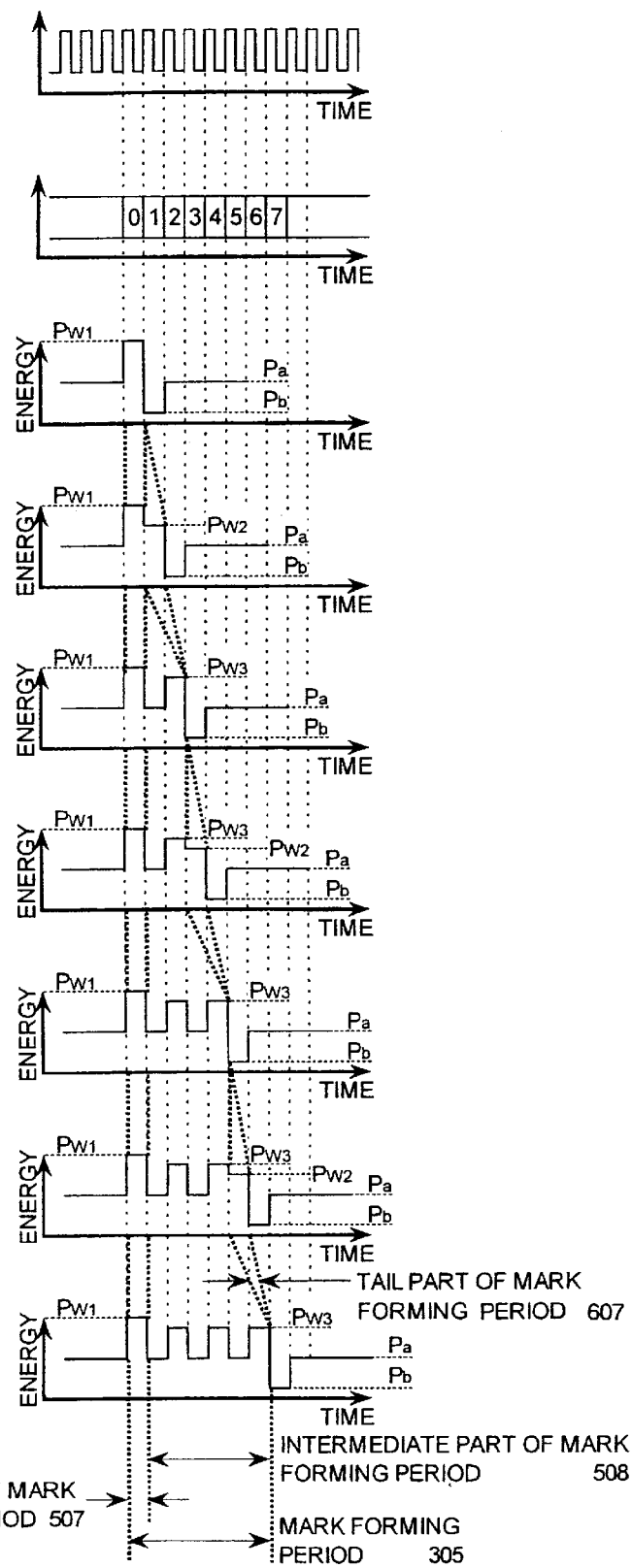
FIG. 6 is a view for explaining another example of recording waveforms in the recording processing system according to the embodiment of the present invention.

Other examples 600 to 606 of recording waveforms in the apparatus according to the present invention will be described below with reference to the diagrams (a) to (i) of FIG. 6. Assume that the encoder 113 has a coding rule in which NRZI modulation is applied after (1, 7) modulation in the same manner as shown in the diagrams (a) to (i) of FIG. 4 and the diagrams (a) to (i) of FIG. 5. Assume further that the operation of the mark length classifier 201 in FIG. 2 is division (an arithmetic operation for remainder) by a divisor 2 and the mark length classification signal discriminates the mark/space in the recording data sequence in the case of an even-number multiple of the detection window width Tw or an odd-number multiple of the detection window width Tw. The diagram (b) of FIG. 6 shows a count signal 205 generated by the counter 200. The time from the head of a mark is measured with the detection window width Tw as a unit. The timing at which the count signal shifts to zero corresponds to the head of a mark or space. The diagram (c) of FIG. 6 shows a recording waveform at the time of the formation of a 2 Tw-length mark. A mark forming period 305 is constituted by a pulse having a length of 1 Tw and a level of Pw1. In a mark non-forming period, a period having a length of 1 Tw and a level of Pb is placed in the head and then a level of Pa is kept until the next mark forming period comes. The diagram (e) of FIG. 6 shows a recording waveform at the time of the formation of a 4 Tw-length mark. A mark forming period 305 is constituted by a pulse having a length of 1 Tw and a level of Pw1 in the same manner as shown in the diagram (c) of FIG. 6, a period having a length of 1 Tw and a level of Pa, and a period having a length of 1 Tw and a level of Pw3. After that, when the mark length is an even-number multiple of the detection window width Tw as shown in the diagrams (g) and (i) of FIG. 6, a period having a length of 1 Tw and a level of Pa and a period having a length of 1 Tw and a level of Pw3 per mark length 2 Tw are inserted between the head part and the tail part in the mark forming period. In this case, it may be considered that the mark forming period has a tail part having a zero length. The diagram (d) of FIG. 6 shows a recording waveform at the time of the formation of a 3 Tw-length mark. A mark forming period 305 is constituted by a pulse having a length of 1 Tw and a level of Pw1 in the same manner as shown in the diagram (d) of FIG. 5, and a period having a length of 1 Tw and a level of Pw2. After that, when the mark length is an odd-number multiple of the detection window width Tw as shown in the diagrams (f) and (h) of FIG. 6, a period having a length of 1 Tw and a level of Pa and a period having a length of 1 Tw and a level of Pw3 per mark length 2 Tw are inserted between the head part and the tail part in the mark forming period. In the mark non-forming period, a period having a length of 1 Tw and a level of Pb is placed in the head regardless of the space length and then a level of Pa is kept until the next mark forming period comes. In these examples of recording waveforms, the shortest cooling period in the mark forming period 305 is 1 Tw.

In the examples shown in FIG. 6, the recording waveform in each mark forming period 305 is constituted by head, intermediate and tail parts 507, 508 and 607. The interval between arbitrary two points of the change of the energy level in a mark forming period for an arbitrary-length mark is always longer than 1 Tw and is an integer multiple of 1 Tw. The head part 507 of the mark forming period is a part having a level of Pw1. The intermediate part 508 of the mark forming period is a part in which a period having a level of Pw3 and a length of 1 Tw and a period having a level of Pa and a length of 1 Tw are alternated continuously. The tail part 607 of the mark forming period is a part having a level of Pw2. In this case, the head part 507 of the mark forming period is always constant whereas the tail part 607 of the mark forming period has periodicity of 2 Tw with respect to the mark length. That is, when the mark length is an odd-number multiple of detection window Tw such as 3 Tw, 5 Tw or 7 Tw, the recording waveform in the tail part 607 of the mark forming period has periodic analogy (a length of 1 Tw, a level of Pw1). When the mark length is an even-number multiple of detection window Tw such as 2 Tw, 4 Tw, 6 Tw or 8 Tw, the recording waveform in the tail part 607 of the mark forming period has periodic analogy (length 0).

Figure 7:
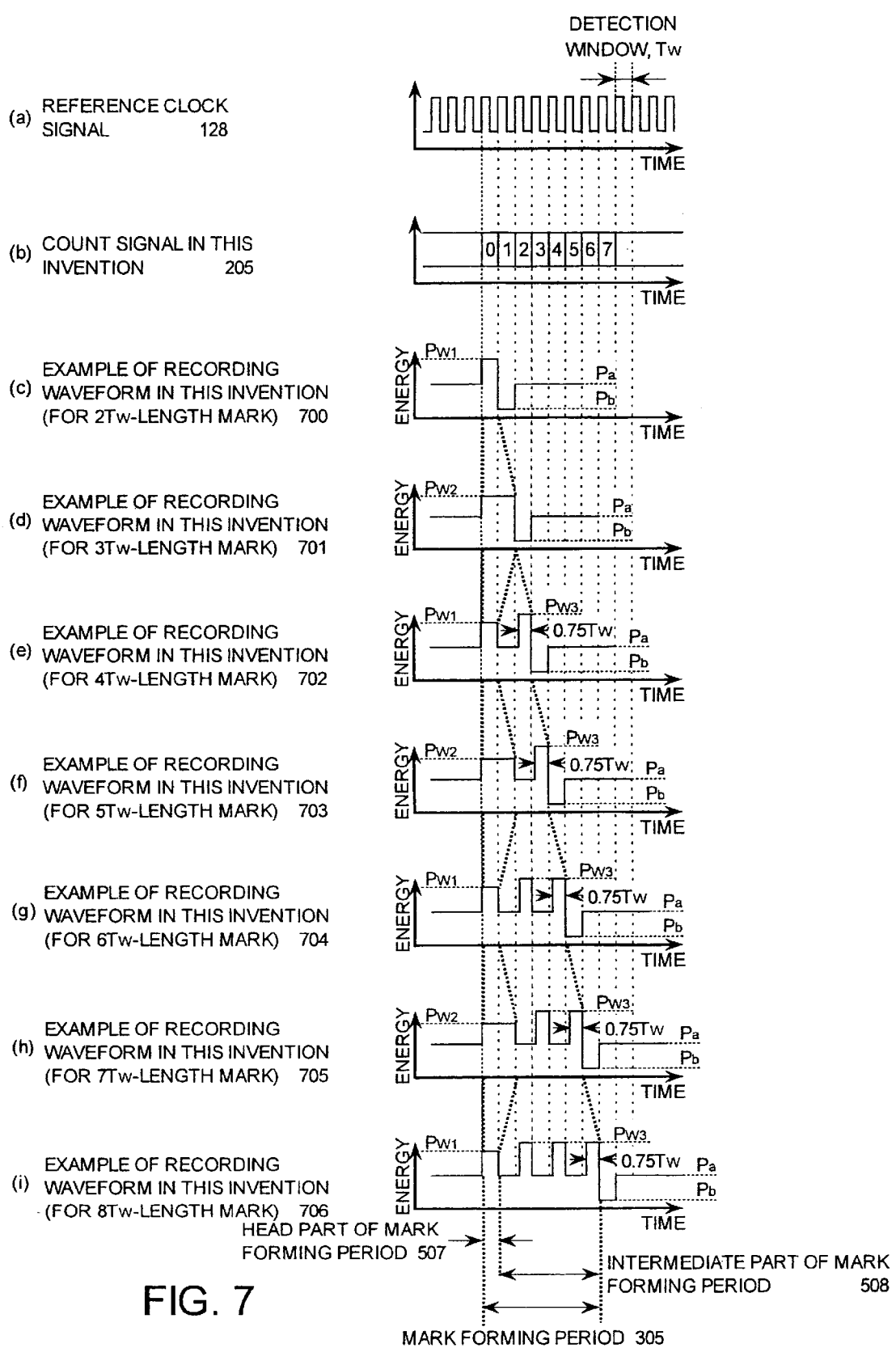
FIG. 7 is a view for explaining a further example of recording waveforms in the recording processing system according to the embodiment of the present invention.

Other examples 700 to 706 of recording waveforms in the apparatus according to the present invention will be described below with reference to the diagrams (a) to (i) of FIG. 7. Assume that the encoder 113 has a coding rule in which NRZI modulation is applied after (1, 7) modulation. Assume further that the operation of the mark length classifier 201 in FIG. 2 is division (an arithmetic operation for remainder) by a divisor 2 and the mark length classification signal discriminates the mark/space in the recording data sequence in the case of an even-number multiple of the detection window width Tw or an odd-number multiple of the detection window width Tw. The diagram (b) of FIG. 7 shows a count signal 205 generated by the counter 200. The time from the head of a mark is measured with the detection window width Tw as a unit. The timing at which the count signal shifts to zero corresponds to the head of a mark or space. The diagram (c) of FIG. 7 shows a recording waveform at the time of the formation of a 2 Tw-length mark. A mark forming period 305 is constituted by a pulse having a length of 1 Tw and a level of Pw1. In a mark non-forming period, a period having a length of 1 Tw and a level of Pb is placed in the head and then a level of Pa is kept until the next mark forming period comes. The diagram (e) of FIG. 7 shows a recording waveform at the time of the formation of a 4 Tw-length mark. A mark forming period 305 is constituted by a pulse having a length of 1 Tw and a level of Pw1 in the same manner as shown in the diagram (c) of FIG. 7, a period having a length of 1.25 Tw and a level of Pa, and a period having a length of 0.75 Tw and a level of Pw3. After that, when the mark length is an even-number multiple of the detection window width Tw as shown in the diagrams (g) and (i) of FIG. 7, a period having a length of 1.25 Tw and a level of Pa and a period having a length of 0.75 Tw and a level of Pw3 per mark length 2 Tw are added to the tail part in the mark forming period. The diagram (d) of FIG. 7 shows a recording waveform at the time of the formation of a 3 Tw-length mark. A mark forming period 305 is constituted by a pulse having a length of 2 Tw and a level of Pw2. After that, when the mark length is an odd-number multiple of the detection window width Tw as shown in the diagrams (f) and (h) of FIG. 7, a period having a length of 1.25 Tw and a level of Pa and a period having a length of 0.75 Tw and a level of Pw3 per mark length 2 Tw are added to the tail part in the mark forming period. In the mark non-forming period, a period having a length of 1 Tw and a level of Pb is placed in the head regardless of the space length and then a level of Pa is kept until the next mark forming period comes. In these examples of recording waveforms, the shortest cooling period in the mark forming period 305 is 1.25 Tw.

In the examples shown in the diagrams (c) to (i) of FIG. 7, the recording waveform in each mark forming period 305 is constituted only by head and intermediate parts 507 and 508 of the mark forming period. The interval between arbitrary two points of the change of the energy level in a mark forming period for an arbitrary-length mark is always longer than 0.5 Tw. The head part 507 of the mark forming period is a part having a level of Pw1 or Pw2. The intermediate part 508 of the mark forming period is a part in which a period having a level of Pw3 and a length of 0.75 Tw and a period having a level of Pa and a length of 1.25 Tw are alternated continuously. The tail part of the mark forming period has a length of zero, that is, there is no tail part in the mark forming period. In this case, the head part of the mark forming period has periodicity of 2 Tw with respect to the mark length. That is, when the mark length is an odd-number sequence such as 3 Tw, 5 Tw or 7 Tw, the recording waveform in the head part 507 of the mark forming period has periodic analogy (a period having a length of 2 Tw and a level of Pw2). When the mark length is an even-number sequence such as 2 Tw, 4 Tw, 6 Tw or 8 Tw, the recording waveform in the head part 507 of the mark forming period has periodic analogy (a period having a length of 1 Tw and a level of Pw1).

According to the aforementioned embodiment, in an information recording apparatus for injecting an energy beam into a recording medium to form a mark different in physical properties from a non-mark portion to thereby record information, the mark can be formed accurately and speedily. Accordingly, a mark edge recording system advantageous in high recording linear density can be used as a recording system. From the above description, increase of the speed of the recording/reproducing operation and enhancement of reliability can be attained and, at the same time, reduction in the size of the information recording apparatus and reduction in the size of the recording medium can be achieved so as to bring an advantage in cost.

What is claimed is:

1. An information recording apparatus for injecting an energy beam formed of a number of injected energy pulses into a recording medium to form a mark different in physical properties from a non-mark portion to thereby record information, comprising:

an encoding means for converting information into a recording data sequence;

a classification means for performing classification in accordance with a predetermined rule by referring to a mark length in said recording data sequence;

an energy generation means for generating energy required for recording; and an energy generation means drive means for changing the number of injected energy pulses in a mark forming period in accordance with the mark length in said recording data sequence, wherein said drive means drives said energy generation means in accordance with a procedure which varies in dependence upon a result of the classification performed by said classification means.

2. An information recording apparatus according to claim 1, wherein all intervals from rise to fall in injected energy pulses of the energy beam in the mark forming period are longer than half of a detection window width.

3. An information recording apparatus according to claim 1, wherein the time required for cooling in the mark forming period for an arbitrary-length mark is always set to be not shorter than a detection window width.

4. An information recording apparatus according to claim 1, wherein all intervals from rise to fall in infected energy pulses of the energy beam in the mark forming period are not shorter than a detection window width and are substantially an integer multiple of a half of the detection window width.

5. An information recording apparatus according to claim 1, wherein the period of injected energy pulses in an intermediate part of the mark forming period is not shorter than twice the detection window width and is an integer multiple of the detection window width.

6. An information recording apparatus according to claim 1, wherein said classification means classifies a mark having a length equal to a natural-number (n) multiple of the detection window width by a remainder which is given when the natural number n is divided by an integer constant not smaller than 2.

7. An information recording apparatus for injecting an energy beam formed of a number of infected energy pulses into a recording medium to form a mark different in physical properties from a non-mark portion to thereby record information, comprising:

an encoding means for converting information into a recording data sequence;

an energy generation means for generating energy required for recording; and an energy generation means drive means for changing the number of injected energy pulses in a mark forming period in accordance with mark length in said recording data sequence, wherein:

said drive means drives said energy generation means so that an output waveform of said energy generation means in a predetermined part of said mark forming period has periodicity with respect to the mark length; and said drive means drives said energy generation means so that all intervals from rise to fall in injected energy pulses of the energy beam in the mark forming period are longer than half of a detection window.

8. An information recording apparatus according to claim 7, wherein said drive means drives said energy generation means so that an output waveform of said energy generation means in a head part of said mark forming period has periodicity with respect to the mark length.

9. An information recording apparatus according to claim 7, wherein said drive means drives said energy generation means so that an output waveform of said energy generation means in a tail part of said mark forming period has periodicity with respect to the mark length.

* * * * *

UNITED STATES PATENT AND TRADEMARK OFFICE
CERTIFICATE OF CORRECTION

PATENT NO. : 6,256,277 B1
DATED : July 3, 2001
INVENTOR(S) : H. Saga et al.

It is certified that error appears in the above-identified patent and that said Letters Patent is hereby corrected as shown below:

<u>Title page,</u>
Delete item [73] and insert therefore:
-- [73] Assignee: Hitachi, Ltd., Tokyo (JP) --

Signed and Sealed this

Thirtieth Day of April, 2002

Attest:

Attesting Officer

JAMES E. ROGAN
*Director of the United States Patent and Trademark Office*